US010365655B2

United States Patent
Im et al.

(10) Patent No.: US 10,365,655 B2
(45) Date of Patent: Jul. 30, 2019

(54) ECU, AUTONOMOUS VEHICLE INCLUDING ECU, AND METHOD OF CONTROLLING LANE CHANGE FOR THE SAME

(71) Applicants: Hyundai Motor Company, Seoul (KR); Kia Motors Corporation, Seoul (KR)

(72) Inventors: Seong Su Im, Gyeonggi-do (KR); Tae Seok Lee, Seoul (KR); Seok Youl Yang, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/808,064

(22) Filed: Nov. 9, 2017

(65) Prior Publication Data
US 2019/0004529 A1  Jan. 3, 2019

(30) Foreign Application Priority Data
Jul. 3, 2017 (KR) .................. 10-2017-0084343

(51) Int. Cl.
*G05D 1/02* (2006.01)
*G08G 1/0968* (2006.01)
(Continued)

(52) U.S. Cl.
CPC .......... *G05D 1/0223* (2013.01); *G05D 1/0061* (2013.01); *G05D 1/0221* (2013.01);
(Continued)

(58) Field of Classification Search
CPC .......... G05D 1/0223; G05D 1/00; G05D 1/02; G06F 7/00; G06K 9/00; G01C 21/34; G08G 1/16; G08G 1/0968
See application file for complete search history.

(56) References Cited

U.S. PATENT DOCUMENTS 8,108,134 B2 * 1/2012 Kageyama .......... B60R 21/0134
382/104
2010/0274473 A1 * 10/2010 Konishi ............. G01C 21/3697
701/532
(Continued)

FOREIGN PATENT DOCUMENTS

DE 102012216422 A1 * 3/2014 ............. G08G 1/167
EP 2 963 632 A1 1/2016
(Continued)

*Primary Examiner* — Yuri Kan
(74) *Attorney, Agent, or Firm* — Mintz Levin Cohn Ferris Glovsky and Popeo, P.C.; Peter F. Corless

(57) ABSTRACT

A method of controlling lane change of an autonomous vehicle is provided. The method includes determining a type of a command for lane change by an autonomous driving logic of an electronic control unit (ECU) in response to the command for lane change being generated. When the command for lane change is not a specific command for lane change, attributes of each of at least one region included in a change target region is determined using information regarding the change target region. The attributes of each of the at least one region are corrected using information regarding a lane in which the autonomous vehicle is driven and a lane change region is determined from the at least one region based on the corrected attributes of each of the at least one region.

19 Claims, 9 Drawing Sheets

(51) Int. Cl.
*G08G 1/16* (2006.01)
*G05D 1/00* (2006.01)

(52) U.S. Cl.
CPC ........... *G05D 1/0231* (2013.01); *G08G 1/166* (2013.01); *G08G 1/167* (2013.01); *G05D 1/0088* (2013.01); *G05D 2201/0213* (2013.01)

(56) References Cited

U.S. PATENT DOCUMENTS

| | | | |
|---|---|---|---|
| 2011/0118929 A1* | 5/2011 | Takae | B60W 50/16 701/31.4 |
| 2014/0044311 A1* | 2/2014 | Takahashi | G08G 1/166 382/103 |
| 2014/0207325 A1 | 7/2014 | Mudalige et al. | |
| 2015/0142207 A1 | 5/2015 | Flehmig et al. | |
| 2015/0345964 A1* | 12/2015 | Oooka | B60W 30/12 701/41 |
| 2015/0353085 A1 | 12/2015 | Lee | |
| 2016/0090087 A1 | 3/2016 | Lee | |
| 2016/0091896 A1 | 3/2016 | Maruyama | |
| 2017/0235307 A1* | 8/2017 | Asakura | B60W 40/12 701/23 |
| 2017/0261989 A1* | 9/2017 | Ishioka | G01C 21/34 |

FOREIGN PATENT DOCUMENTS

| | | | | |
|---|---|---|---|---|
| JP | WO-2013171958 A1 * | 11/2013 | | G08G 1/16 |
| JP | 2015-066963 A | 4/2015 | | |
| JP | 2015-075889 A | 4/2015 | | |
| KR | 10-0798815 B | 1/2008 | | |

* cited by examiner

FIG. 3

| Scenario | Command for lane change | Description and example of scenario | Drawing of example of scenario |
|---|---|---|---|
| First Scenario | General command for lane change | Situation in which lane change is not needed immediately or within short time. Lane change/passing is good but this is not always needed. | |
| Second Scenario | Congested area command for lane change | Situation in which lane change/passing is good but this is not always needed. Space between vehicles driven along change target lane is not continuously allowed. | |
| Third Scenario | Necessary command for lane change 1 | Lane change is needed but allowable distance of 1 to 2 km is present before point of lane change. Ex1) lane change to third or fourth lane as rightmost lane from first lane at point 1 to 2 km before IC/JC. Ex2) When section under construction or accident vehicle is pre-recognized via navigation device/communication, etc. at point 1 to 2 km before current road | |
| Fourth Scenario | Necessary command for lane change 2 | Lane change is needed and allowable distance is equal to or less than several hundred m before point for lane change. Ex1) When entering pocket lane around entrance of IC/JC pocket lane. Ex2) When section under construction or accident vehicle is present just before current road | |

FIG. 4
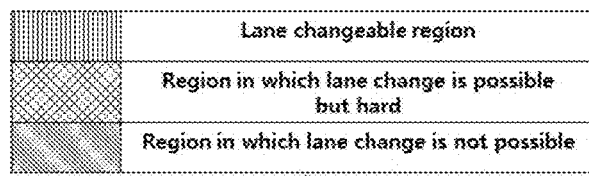
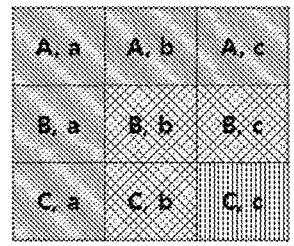
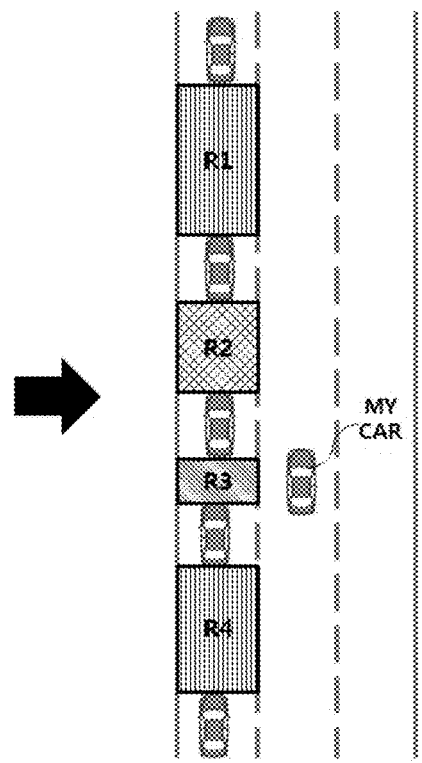

FIG. 7

$$B+C+D+E+F+G = \frac{\{v_{reg(a)}(0)-v_{ego}(0)\}^2}{2a_{ccc}} + \frac{1}{2}\{v_{max}-v_{reg(a)}(0)\}\{\frac{v_{max}-v_{reg(a)}(0)}{a_{ccc}} + \frac{v_{reg(a)}(0)-v_{max}}{a_{ccc}}\} + \{v_{reg(a)}(0)-v_{ego}(0)\}\{\frac{v_{max}-v_{reg(a)}(0)}{a_{ccc}} + \frac{v_{reg(a)}(0)-v_{max}}{a_{ccc}}\}$$

$$= \frac{\{v_{reg(a)}(0)-v_{ego}(0)\}^2}{2a_{ccc}} + \{\frac{v_{max}-v_{reg(a)}(0)}{a_{ccc}} + \frac{v_{reg(a)}(0)-v_{max}}{a_{ccc}}\}\{\frac{1}{2}v_{max} + \frac{1}{2}v_{reg(a)}(0) - v_{ego}(0)\} \quad \Rightarrow \text{EXPRESSION 1}$$

$$\frac{\{v_{reg(a)}(0)-v_{ego}(0)\}^2}{2a_{max}} + \{\frac{v_{max}-v_{reg(a)}(0)}{a_{ccc}} + \frac{v_{reg(a)}(0)-v_{max}}{a_{ccc}}\}\{\frac{1}{2}v_{max} + \frac{1}{2}v_{reg(a)}(0) - v_{ego}(0)\} = Safety\_Allowance \quad \Rightarrow \text{EXPRESSION 2}$$

$$A-(D+E) = \frac{\{v_{reg(a)}(0)-v_{ego}(0)\}^2}{2a_{ccc}} - \frac{1}{2}\{v_{max}-v_{reg(a)}(0)\}\{\frac{v_{max}-v_{reg(a)}(0)}{a_{ccc}} + \frac{v_{reg(a)}(0)-v_{max}}{a_{ccc}}\}$$

$$= \frac{\{v_{reg(a)}(0)-v_{ego}(0)\}^2 - \{v_{max}-v_{reg(a)}(0)\}^2}{2a_{ccc}} - \frac{v_{reg(a)}(0)-v_{max}}{2a_{ccc}}$$

$$= \frac{\{v_{ego}(0)-v_{max}\}\{v_{max}+v_{ego}(0)-2v_{reg(a)}(0)\}}{2a_{ccc}} - \frac{v_{reg(a)}(0)-v_{max}}{2a_{ccc}} \quad \Rightarrow \text{EXPRESSION 3}$$

$$xMin_{reg(a)}(0) + \frac{\{v_{ego}(0)-v_{max}\}\{v_{max}+v_{ego}(0)-2v_{reg(a)}(0)\}}{2a_{ccc}} - \frac{v_{reg(a)}(0)-v_{max}}{2a_{ccc}} < -Dist\_Threshold \quad \Rightarrow \text{EXPRESSION 4}$$

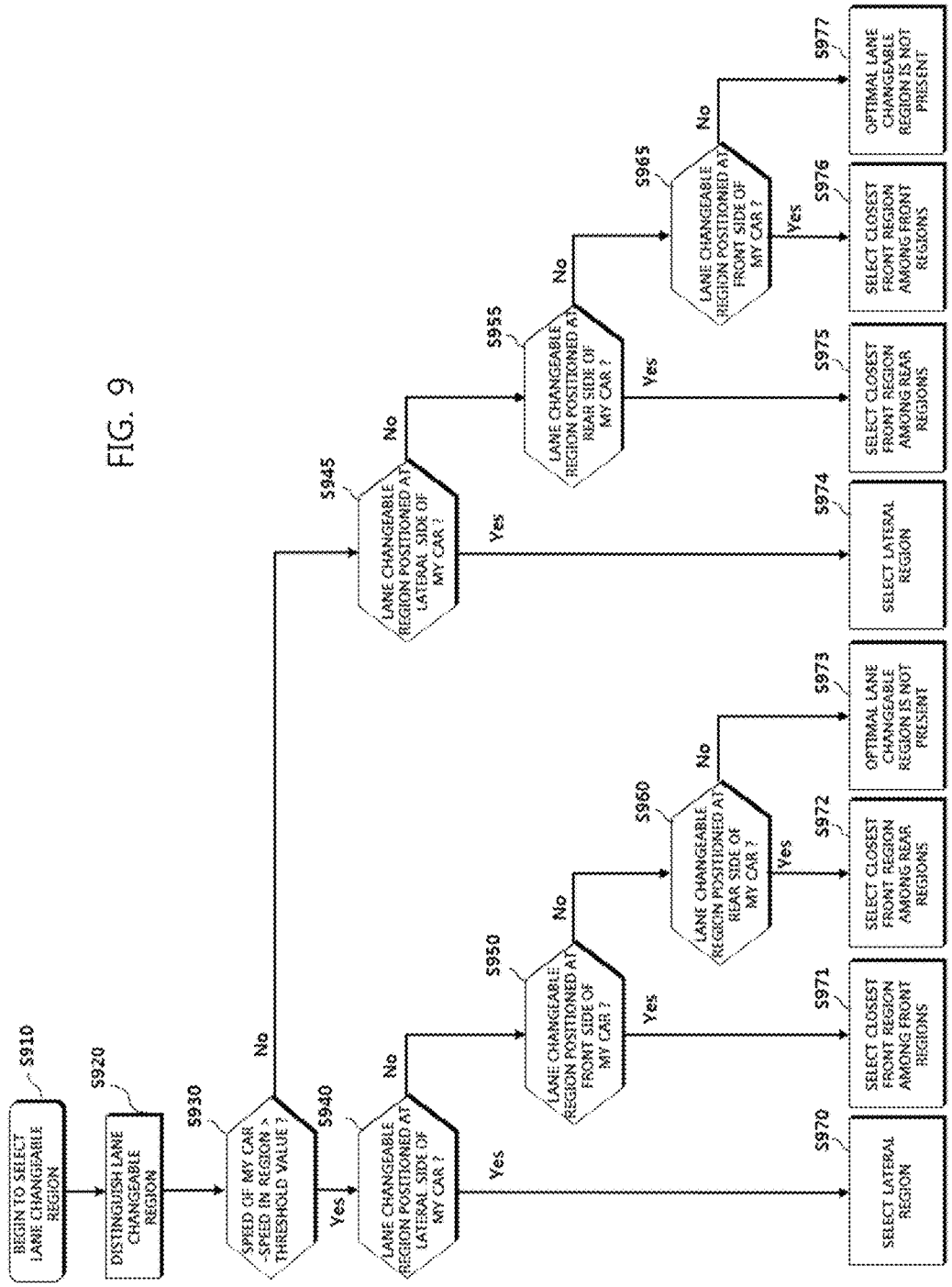

<WHEN LANE CHANGEABLE REGION IS POSITIONED AT REAR AND LATERAL SIDE>

<WHEN LANE CHANGEABLE REGION IS POSITIONED AT FRONT AND LATERAL SIDE>

ECU, AUTONOMOUS VEHICLE INCLUDING ECU, AND METHOD OF CONTROLLING LANE CHANGE FOR THE SAME

CROSS-REFERENCE TO RELATED APPLICATION(S)

This application claims the benefit of Korean Patent Application No. 10-2017-0084343, filed on Jul. 3, 2017, which is hereby incorporated by reference as if fully set forth herein.

BACKGROUND

Field of the Invention

The present invention relates to an electronic control unit (ECU), an autonomous vehicle including the ECU, and a method of controlling lane change thereof, and more particularly, to an ECU, an autonomous vehicle including the ECU, and a control method of lane change thereof that are capable of performing an improved lane change.

Discussion of the Related Art

Recently, interest in autonomous driving technology of vehicles has increased. Autonomous driving technology refers to technology for automatic vehicle driving without driver intervention. In general, to change lanes during autonomous driving, movement (a relative position, relative speed, and on the like) of surrounding vehicles is recognized using a distance measurement sensor such as a radar and a LiDAR sensor, installed within the vehicle, and whether lanes are changed is determined based on the recognized information.

When driving a vehicle, a driver operates the vehicle based on a current traffic flow. The driver typically changes lanes when appropriate based on distance to surrounding vehicles or actively accelerates or decelerates the vehicle to attempt to change lanes when distance between the vehicles is less limiting. Similarly, an autonomous vehicle also requires a lane change while controlling acceleration and deceleration when necessary.

For example, when a driver needs to change a destination to enter a close interchange (IC)/junction (JC), a driver recognizes an accident vehicle or a section under construction in front of a driving vehicle via vehicle communication and on the like, a user may input a command for rapid lane change or a command for lane change in a congested area, or even when a driver does not change a destination during driving on a highway, a close IC/JC is present before an IC/JC on an original path or an IC/JC is nearby on a path since a vehicle does not change lanes to the right direction to yield to merging vehicles.

In addition, when a driver enters an IC/JC entrance and is unable to immediately enter a pocket lane, it is necessary to change lanes more rapidly. In particular, as a vehicle speed difference between a current lane and a change target lane increases, the number of opportunities to change from the current lane to the change target lane decreases and, thus, it is more difficult to change lanes rapidly. In these cases, there is a need for a method of rapidly and appropriately changing lanes by an autonomous vehicle adaptively to a situation in which lane change is required without obstructing traffic flow and an increase in accident risk.

SUMMARY

An object of the present invention is to provide an electronic control unit (ECU), an autonomous vehicle including the ECU, and a method of controlling lane change thereof, for selecting a most appropriate lane change region and performing lane change.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling lane change of an autonomous vehicle may include determining a type of a command for lane change using an autonomous driving logic of an electronic control unit (ECU) in response to the command for lane change being generated, when the command for lane change is not a specific command for lane change, determining attributes of each of at least one region included in a change target region using information regarding the change target region, correcting the attributes of each of the at least one region using information regarding a lane in which the vehicle is driven, and determining a lane change region from the at least one region based on the corrected attributes of each of the at least one region.

In another aspect of the present invention, an electronic control unit (ECU) of an autonomous vehicle may include a main control logic configured to generate a command for lane change classified into commands for lane change based on first to fourth scenarios, and a lane change region determiner configured to, when the command for lane change is not a specific command for lane change, determine attributes of each of at least one region included in a change target region using information regarding the change target region, to correct the attributes of each of the at least one region using information regarding a lane in which the vehicle is driven, and to determine a lane change region from the at least one region based on the corrected attributes of each of the at least one region.

In another aspect of the present invention, an autonomous vehicle may include an electronic control unit (ECU) configured to, when the command for lane change is not a specific command for lane change, determine attributes of each of at least one region included in a change target region using information regarding the change target region, to correct the attributes of each of the at least one region using information regarding a lane in which the vehicle is driven, and to determine a lane change region from the at least one region based on the corrected attributes of each of the at least one region. The vehicle may thus be operated based on a control signal generated by the ECU.

It is to be understood that both the foregoing general description and the following detailed description of the present invention are exemplary and explanatory and are intended to provide further explanation of the invention as claimed.

BRIEF DESCRIPTION OF TILE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings:

FIG. 3 is a table showing types of a command for lane change and situations corresponding thereto according to a scenario according to an exemplary embodiment of the present invention;

FIG. 4 is a diagram showing determination of a lane changeable region of operation S20 according to an exemplary embodiment of the present invention according to an exemplary embodiment of the present invention;

FIG. 7 is a diagram showing expressions for correcting attributes of a change target region when speed in the change target region is greater than vehicle speed according to an exemplary embodiment of the present invention;

Figure 10A:
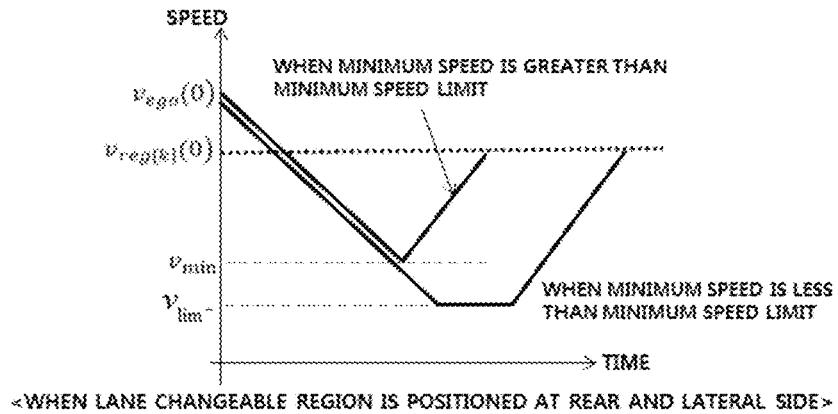
Figure 10B:
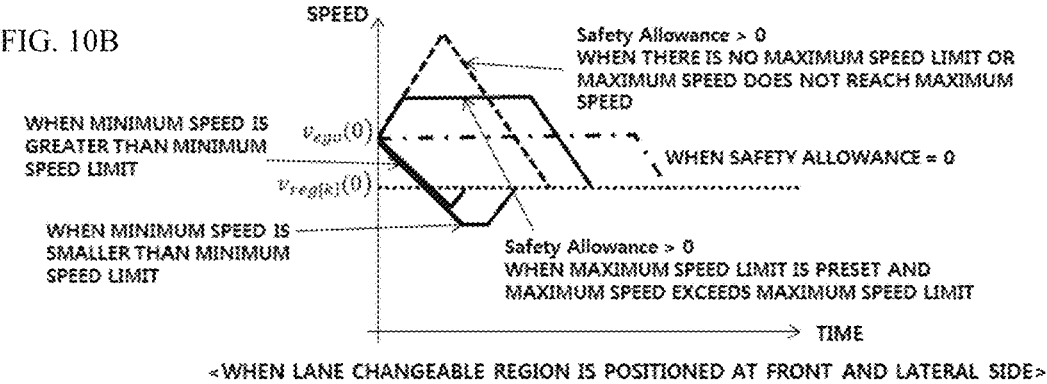

FIG. 9 is a flowchart showing an algorithm for selecting an optimum lane changeable region when a command for lane change according to a second scenario is input according to an exemplary embodiment of the present invention; and FIGS. 10A-10B are diagrams showing an explanation of a method of selecting an optimum lane changeable region when a command for lane change according to a third scenario is input according to an exemplary embodiment of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. In addition, the suffixes "module" and "unit" of elements herein are used for convenience of description and thus can be used interchangeably and do not have any distinguishable meanings or functions.

Figure 1:
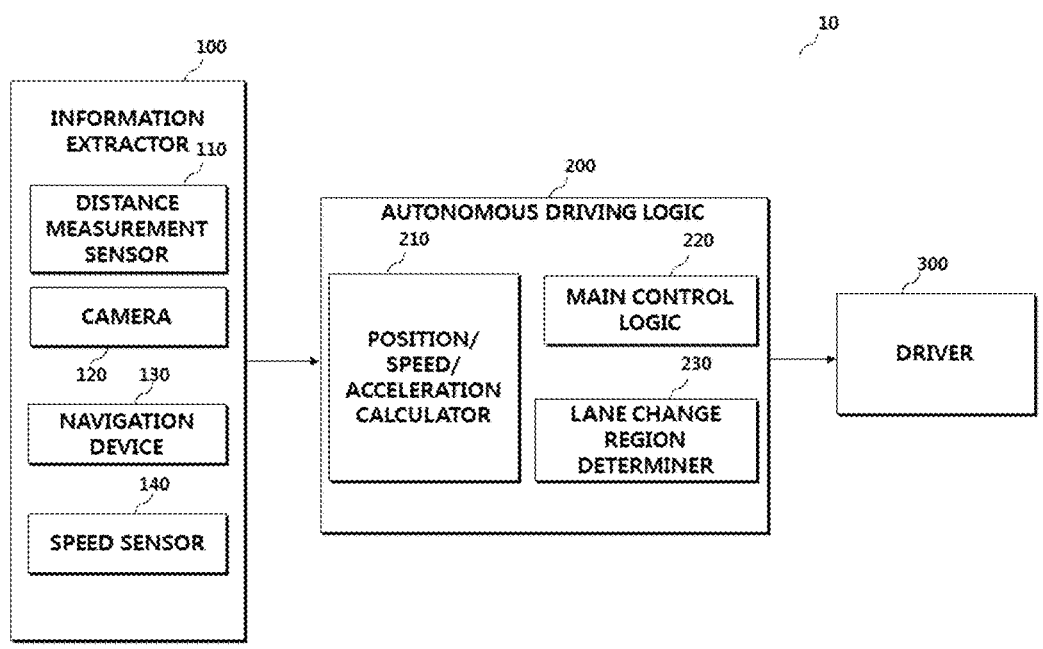
FIG. 1 is a schematic block diagram showing a vehicle according to an exemplary embodiment of the present invention.

FIG. 1 is a schematic block diagram showing a vehicle 10 according to an exemplary embodiment of the present invention. Referring to FIG. 1, the vehicle 10 is a vehicle using autonomous driving technology which refers to technology for automatic vehicle driving without driver intervention. The autonomous driving technology is used to ensure user safety to prevent accidents as well as to enhance user convenience. The vehicle 10 may include an information extractor 100, an autonomous driving logic 200, and a driver 300. The information extractor 100 may be operated by a controller having a memory in which the autonomous driving logic 200 is stored to be executed by a process of the controller.

The information extractor 100 may be configured to collect information regarding surroundings of the vehicle 10 and may include a distance measurement sensor 110 configured to acquire distance information from an object positioned around the vehicle 10, an imaging device 120 (e.g., a camera, video camera, or the like) configured to acquire image information captured by photographing the surroundings of the vehicle 10, a navigation device 130 configured to provide traffic information regarding a road on which the vehicle 10 is currently being driven and route guidance information to a destination, and a speed sensor 140 configured to detect the speed at which the vehicle 10 is currently being driven. The autonomous driving logic 200 may be software, hardware, or a combination thereof, for performing a function of autonomous driving. The autonomous driving logic 200 may be embodied as a portion of an electronic control unit (ECU) of the vehicle 10 but the scope of the present invention may not be limited thereto.

A position/speed/acceleration calculator 210 may be configured to calculate a position, speed, and acceleration of a surrounding vehicle based on at least one of distance information and image information from the information extractor 100. The position, speed, and acceleration of the vehicle may include a relative position, relative speed, and relative acceleration of another vehicle. The relative position, the relative speed, and the relative acceleration may be separated into horizontal and longitudinal direction components and stored. Particularly, the position, speed, and acceleration may be updated every measurement period of the distance measurement sensor 110 or the imaging device 120 and information regarding surrounding vehicles to be recognized as the same vehicle may match a corresponding surrounding vehicle and may be stored.

A main control logic 220 may be configured to execute an overall autonomous driving function. In particular, the main control logic 220 may be configured to generate a signal for operating the driver 300 based on the information provided by the position/speed/acceleration calculator 210 and a lane change region determiner 230. The main control logic 220 may be configured to generate a command for lane change to activate the lane change region determiner 230. The lane change region determiner 230 may be configured to determine a lane changeable region under control of the main control logic 220 and correct the lane changeable region to select an optimum lane changeable region, which will be described in detail with reference to FIGS. 3 to 11.

The driver 300 may be a component configured to operate the vehicle 10 based on a control signal of the main control logic 220 and may include components for adjusting vehicle driving, such as a brake pedal, an accelerator, a transmission, and a steering device. For example, when the control signal of the main control logic 220 is a signal that indicates lane change to a left lane along with acceleration, the accelerator of the driver 300 may be configured to perform acceleration and the steering device may be configured to perform driving control for applying torque in the left direction.

Figure 2:
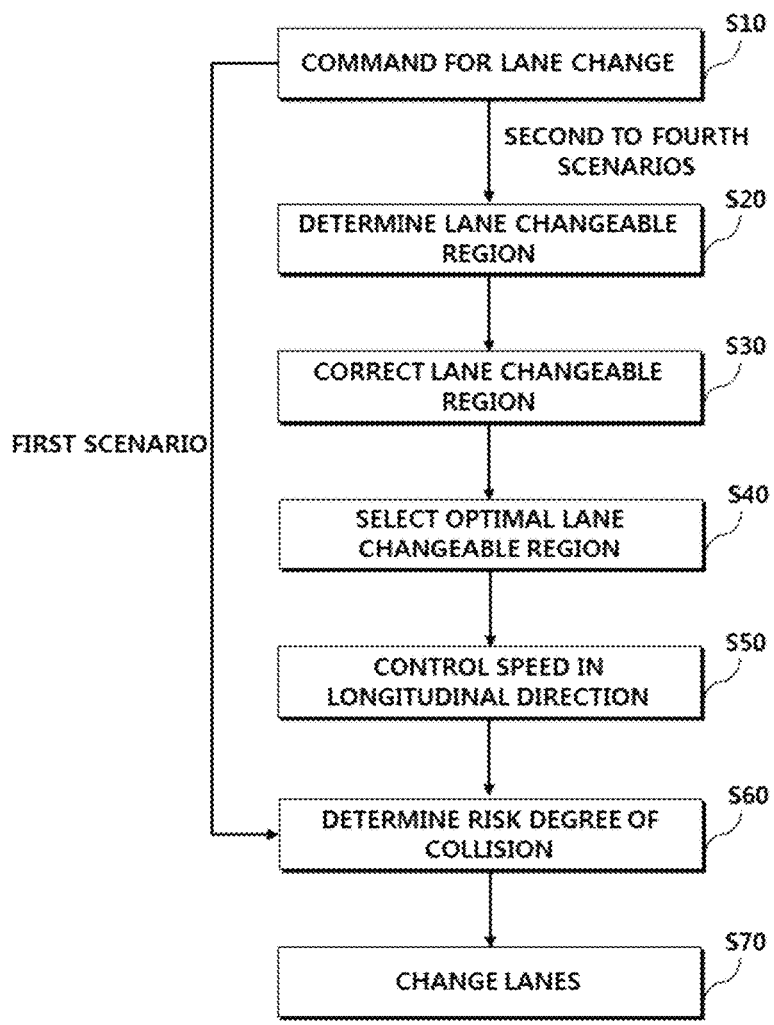
FIG. 2 is a flowchart illustrating an operation method of an autonomous driving logic shown in FIG. 1 according to an exemplary embodiment of the present invention.
Figure 5:
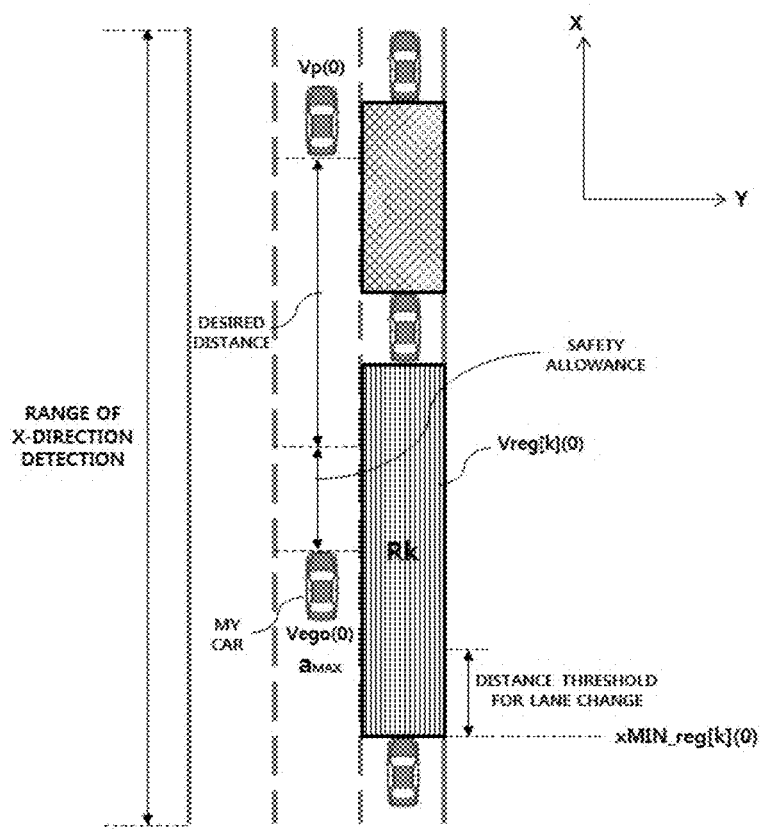
FIG. 5 is a diagram for explanation of parameters for operation S30.
Figure 8:
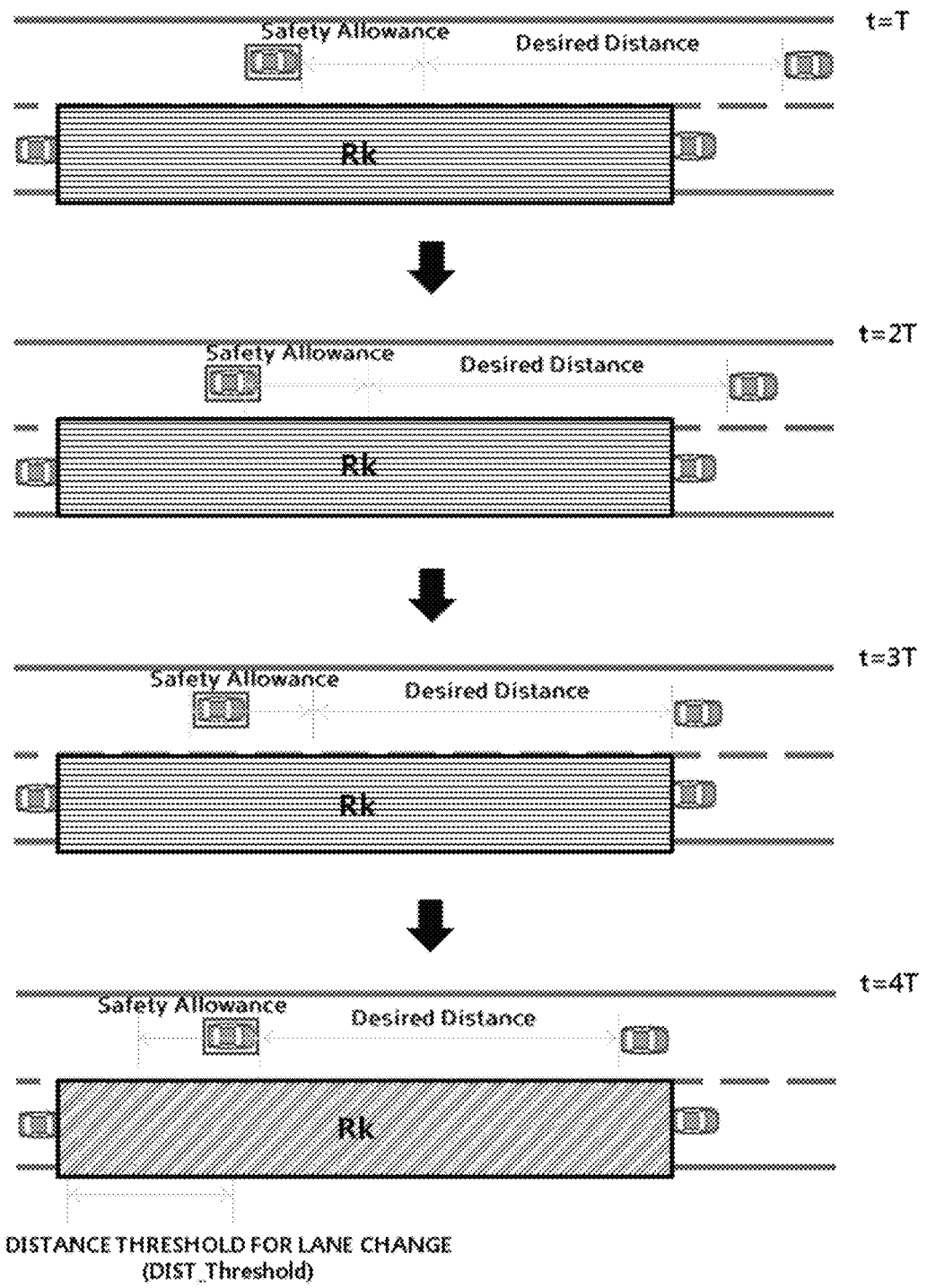
FIG. 8 is a diagram showing an example of correcting attributes of a region according to an exemplary embodiment of the present invention.

FIG. 2 is a flowchart illustrating an operation method of the autonomous driving logic shown in FIG. 1. FIG. 3 is a table showing types of a command for lane change and situations corresponding thereto according to a scenario. FIG. 4 is a diagram showing determination of a lane changeable region of operation S20. FIG. 5 is a diagram for explanation of parameters for operation S30. FIG. 6 is a diagram showing an example of a method of operating a vehicle when speed at a change target region is greater than vehicle speed. FIG. 7 is a diagram showing expressions for correcting attributes of a change target region when speed in the change target region is greater than vehicle speed. FIG. 8 is a diagram showing an example of correcting attributes of a region. FIG. 9 is a flowchart showing an algorithm for selecting an optimum lane changeable region when a command for lane change according to a second scenario is input. FIG. 10 is a flowchart for explanation of a method of selecting an optimum lane changeable region when a command for lane change according to a third scenario is input.

Referring to FIG. 2, each operation of a lane change control method shown in FIG. 2 may be performed by the autonomous driving logic 200. The main control logic 220 may be configured to determine a lane change requirement when the vehicle (e.g., the subject vehicle) is being driven and generate a command for lane change (S10). The command for lane change may be input by a user and generated based on route guidance information of the navigation device 130.

A type of the command for lane change may be classified into, for example, a general command for lane change, a congested area command for lane change, a necessary command for lane change 1, and a necessary command for lane change 2. This classification may be exemplary and may not restrict the scope of the present invention. That is, according to an exemplary embodiment of the present invention, a type of a command for lane change may be classified with regard to a situation in which lanes are changed but a command for lane change may be classified based on another reference.

FIG. 3 shows situations in which lane change is required according to first to fourth scenarios and types of a command for lane change generated to correspond thereto. The general command for lane change may refer to a command for lane change that is generated in a situation (first scenario) in which lane change is not required immediately or within a short period of time. The congested area command for lane change may refer to a command for lane change that is generated in a situation (second scenario) in which speed control is required when a vehicle driver or operator requests a lane change even when lane change is not required but a space between vehicles driven in a change target lane is limited.

The necessary command for lane change 1 may refer to a command for lane change that is generated in a situation (third scenario) in which lane change is required but relative temporal and spatial allowance is present. For example, the necessary command for lane change may correspond to when lane change is required from a first lane to a rightmost lane, e.g., a third or fourth lane at a point 1 to 2 km before an IC/JC or when a road section under construction or an accident vehicle is pre-recognized using a navigation device/communication, etc. at a point 1 to 2 km before a current road.

The necessary command for lane change 2 may refer to a command for lane change that is generated in a situation (fourth scenario) in which lane change is required and temporal and spatial allowance is barely present (e.g., the distance between the traveling vehicles allows for a lane change to be possible). For example, the necessary command for lane change 2 may correspond to when a vehicle enters a pocket lane at a point around an entrance around an IC/JC pocket lane or when an initial position of a section under construction or an accident vehicle is present just before a current road.

The main control logic 220 may be configured to perform operations S20 to S50 except for in the command for lane change (general command for lane change) based on the first scenario among the commands for lane change. For the command for lane change according to the first scenario, when a risk degree of collision upon lane change is low while a vehicle is driven with a traffic flow (e.g., the subject vehicle is traveling the same general speed as surrounding vehicles based on current traffic conditions), lane change may be possible and, thus, the main control logic 220 may be configured to execute control to change lanes just after the risk degree of collision is determined in operation S60 without operations S20 to S50. When the command for lane change according to the second to fourth scenarios is generated, the main control logic 220 may be configured operate the lane change region determiner 230 to determine a lane changeable region.

In particular, the lane change region determiner 230 may be configured to determine whether lane change is possible in a plurality of regions present in a change target lane according to types of the commands for lane change (e.g., whether a current command is a command according to any one of the first to fourth scenarios) and a direction based on the commands for lane change (e.g., whether a desired change corresponds to change to a left or right lane). As described above, the lane change region determiner 230 may not perform operation S20 when the current command for lane change is the command for lane change according to the first scenario.

In response to receiving the command for lane change indicating change to a left lane, the lane change region determiner 230 may be configured to detect a plurality of regions in a current left lane and collect information on each of the plurality of regions. The plurality of regions may be detected by calculating a distance between adjacent surrounding vehicles based on a position of a surrounding vehicle detected in a left lane of the subject vehicle. For example, as shown in a right portion of FIG. 4, when the number of surrounding vehicles detected in a left lane of the subject vehicle is five, areas R1 to R4 may be detected based on a position of each surrounding vehicle.

The lane change region determiner 230 may be configured to determine whether lane change is possible in each area based on a distance between two vehicles (e.g., an uppermost surrounding vehicle (preceding vehicle) and a lower surrounding vehicle (following vehicle)) for defining each area and time to collision (TTC). The TTC is time taken until two vehicles collide while currently moving at a substantially constant speed and is a value calculated based on current speed of the two vehicles and a distance therebetween.

As shown in section a of FIG. 4, the lane change region determiner 230 may be configured to determine whether lane change is possible based on a first condition and a second condition. The first condition may correspond to whether a distance between two vehicles corresponds to a specific range and, for example, when the distance between the two vehicles is less than about 35 m, the first condition may be defined as 'A', when the distance between the two vehicles is equal to or greater than about 35 m and less than about 45 m, the first condition may be defined as 'B', and when the distance between the two vehicles is equal to or greater than about 45 m, the first condition may be defined as 'C'.

The second condition may correspond to whether TTC corresponds to a specific range and, for example, when the TTC is less than about 10 seconds, the second condition may be defined as 'a', when the TTC is equal to or greater than about 10 seconds and less than about 15 seconds, the second condition may be defined as 'b', and when the TTC is equal to or greater than about 15 seconds, the second condition may be defined as 'c'.

As shown in section b of FIG. 4, under the assumption that attributes of each region are classified into a region in which lane change is possible, a region in which lane change is difficult (e.g., due to space restrictions or limitations) even when lane change is possible, and a region in which lane change is not possible, the attributes of each region may be defined by a combination of the first and second conditions, as shown in section c of FIG. 4. For example, the region in which lane change is possible may correspond to when the first condition is 'C' and the second condition is 'c' and the region in which lane change is not possible may correspond to when the first condition is 'A' and the second condition is 'a'.

In FIG. 4, elements (e.g., distance and TTC) included in the first and second conditions, a threshold value (e.g., about 35 m and 45 m) of the first condition, a threshold value (e.g., about 10 seconds and 15 seconds) of the second condition, a classification method of a region (e.g., possible/possible but difficult/impossible), and a matching relation of a combination of the first and second conditions and attributes of a region (e.g., when the first condition is 'C' and the second condition is 'c', lane change is possible) may be exemplary and may be changed based on a situation such as the speed of the subject vehicle, and a driving road.

The lane change region determiner 230 may be configured to determine whether lane change is possible with respect to regions of a change target lane and, then, correct the attributes of a lane changeable region (which includes a lane changeable region and a region in which lane change is possible but difficult) (S30). The lane change region determiner 230 may be configured to calculate a plurality of parameters required to correct the attributes of the lane changeable region prior to correction of the attributes of the lane changeable region. According to another exemplary embodiment of the present invention, this calculation operation may be provided by the main control logic 220 or the position/speed/acceleration calculator 210 instead of the lane change region determiner 230.

Referring to FIG. 5, a driving direction of the subject vehicle may be assumed to be a direction X and a perpendicular direction to a driving direction of the subject vehicle may be a direction Y. A detection range of the direction X may be determined by a limited detection range of a distance sensor of the vehicle and, for example, may be about 100 m ahead and about 75 m behind, but the scope of the present invention is not limited thereto. Initial speed of the vehicle may be defined as Vego(0), maximum acceleration of the vehicle may be defined as $a_{MAX}$, and initial speed of a preceding vehicle in the same lane as the vehicle may be defined as Vp(0).

A desired distance may refer to a distance required to prevent a collision with a preceding vehicle assuming that the subject vehicle is maintained in a current lane (e.g., the subject vehicle continuously travels in the same road lane). Safety allowance may refer to a value calculated by subtracting the desired distance from a distance between the subject vehicle and a preceding vehicle and refer to an additional allowable distance other than the desired distance. In particular, when the preceding vehicle is not present, the safety allowance may be defined by a detection range of the direction X with respect to a forward direction (e.g., the safety allowance is defined as about 100 m).

A region Rk may be present in a right side of the subject vehicle and initial speed of a region may be defined as Vreg[k](0). In particular, initial speed of a region may be calculated as an average value of initial speed of two vehicles for defining the region but the scope of the present invention is not limited thereto. A lower x coordinate of a region Rk may be defined as xMIN_reg[k](0). A distance threshold for lane change refers to a minimum distance for allowing the subject vehicle to enter a change target region and prevent a collision with a following vehicle and is a value that may be changed depending on the region Rk.

Determination of the lane changeable region of the previous operation S20 may correspond to determination of whether there is an allowable space for entrance when the subject vehicle is almost adjacent to a region corresponding to a change target region and is driven at the same speed as the speed in the adjacent region. Particularly, whether the two premises are satisfied, that is, whether the vehicle is adjacent to the corresponding region and whether the speed of the vehicle speed is the same as the speed in the region may not always be satisfied.

Whether the two premises are satisfied may be changed according to a traffic flow or condition in a particular road lane in which the vehicle is driven, a distance between the vehicle and a preceding vehicle in the same lane, relative speed with respect to a change target lane, a relative distance, or the like. In other words, determination of the lane changeable region of operation S20 may be determined using information regarding an internal region of the change target lane and a relation with the lane of the subject vehicle needs to be additionally applied to determine the lane changeable region. Accordingly, in a region in which the above premises are not satisfied, the attributes of the region may be changed to a region in which lane change is not possible. This may be referred to as lane changeable region attributes correction and may correspond to operation S30.

First, the lane changeable region may be classified into four cases below based on a relation between speed in a corresponding region and speed of the subject vehicle and a positional relation between the subject vehicle and the region and lane changeable region attributes correction for each case will be described. The first case may refer to when speed in a change target lane is greater than speed of the subject vehicle and a region Rk is positioned at a front and lateral/lateral side and, in the first case, a method of operating the vehicle to move to the lane changeable region and to be driven at the same speed as the speed in the region may be a method of acceleration, deceleration after acceleration, or acceleration after deceleration. When the speed of the vehicle is decelerated to increase safety allowance and then accelerated, the speed of the vehicle may reach the speed in the region but the possibility that the vehicle is further away from the region is high and, thus, this method is not considered during correction of region attributes.

When a lower x coordinate of a region is greater than a value obtained by subtracting a desired distance from an x coordinate of a preceding vehicle (safety allowance is not present), the vehicle may not reach the region via acceleration and, thus, the attributes of the region may be changed to a region in which lane change is not possible. The lane change region determiner 230 may be configured to detect whether the vehicle is capable of reaching the same speed as the speed in the region via acceleration in consideration of safety allowance. When the vehicle is not capable of reaching the same speed as the speed in the region, the attributes of the region may be changed to the region in which lane change is not possible.

Further, the lane change region determiner 230 may be configured to detect whether a location of the vehicle is ahead of (e.g., the position of the vehicle is beyond) the sum of a lower x coordinate and a distance threshold for lane change in consideration of safety allowance and acceleration when the vehicle is capable of reaching the same speed as the speed in the region. When the location of the vehicle is behind the sum of the lower x coordinate and the distance threshold for lane change, the attributes of the region may be changed to a region in which lane change is not possible.

The second case may refer to when speed in a change target lane is greater than speed of the subject vehicle and a corresponding region is positioned at a rear and lateral side of the subject vehicle. In the second case, a method of operating the vehicle to move to the lane changeable region and to be driven at the same speed as the speed in the region may be a method of acceleration, deceleration after acceleration, or acceleration after deceleration.

The lane change region determiner 230 may be configured to detect whether the vehicle is capable of reaching the same speed as the speed in the region via acceleration in consideration of safety allowance. When the vehicle is not capable of reaching the same speed as the speed in the region, the attributes of the region may be changed to the region in which lane change is not possible. The lane change region determiner 230 may be configured to detect whether a location of the vehicle is ahead of the sum of a lower x coordinate and a distance threshold for lane change in consideration of safety allowance and acceleration when the vehicle is capable of reaching the same speed as the speed in the region. When the location of the vehicle is behind the sum of the lower x coordinate and the distance threshold for lane change, the attributes of the region may be changed to a region in which lane change is not possible.

The operation of the lane change region determiner 230 may be common in the first and second cases and will be described below with reference to FIG. 6. The third case may refer to when speed in a change target lane is equal to or less than speed of the subject vehicle and a corresponding region is positioned at a front and lateral or lateral side of the subject vehicle. In the third case, a method of operating the vehicle to move to the lane changeable region and to be driven at the same speed as the speed in the region may be a method of deceleration, deceleration after acceleration, or acceleration after deceleration.

When speed in a corresponding region is the same as the speed of the vehicle via deceleration in consideration of maximum deceleration (e.g., maximum deceleration of the vehicle while preventing a collision with a following vehicle) when deceleration of the vehicle is allowed, the lane change region determiner 230 may be configured to detect whether a location of the vehicle is ahead of the sum of a lower x coordinate and a distance threshold for lane change and change the attributes of the region to a region in which lane change is not possible when the location of the vehicle is behind the sum of the lower x coordinate and the distance threshold for lane change. When the vehicle is capable of being accelerated after being decelerated or being decelerated after being accelerated, the vehicle is capable of reaching all rear and lateral regions at the same speed as the speed in the region and, thus, in this case, it may not be necessary to correct the attributes of the region.

The fourth case may refer to when speed in a change target lane is equal to or less than speed of the vehicle and a corresponding region is positioned at a rear and lateral side of the vehicle and, in the fourth case, a method of controlling the vehicle to move to the lane changeable region and to be driven at the same speed as the speed in the region may be a method of acceleration after deceleration. When the vehicle is capable of being accelerated after being decelerated, the vehicle may be capable of reaching all rear and lateral regions at the same speed as the speed in the region and, thus, in this case, it may not be necessary to correct the attributes of the region.

The control method stated in the first to fourth cases may include operation of the vehicle to maintain the current speed. For example, deceleration control may include deceleration control after speed is maintained for a predetermined period of time. When deceleration is required in the third or fourth case, a following vehicle is very close (e.g., within a particular distance range) to the subject vehicle by a predetermined distance or less irrespective of safe deceleration or maximum deceleration, deceleration may be determined to not be possible and a lane changeable region to be reached via deceleration is a region in which lane change may thus not be possible.

Figure 6A:
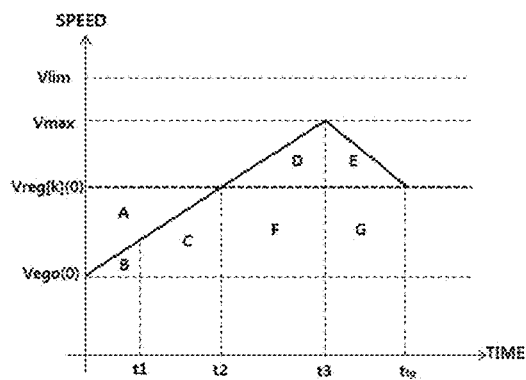
FIGS. 6A-6B are diagrams showing an example of a method of controlling a vehicle when speed at a change target region is greater than vehicle speed according to an exemplary embodiment of the present invention.
Figure 6B:
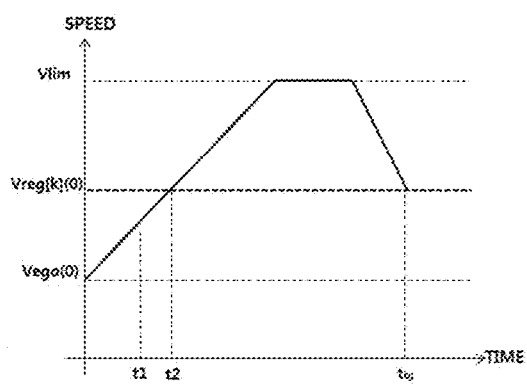

FIGS. 6A-6B illustrate examples of deceleration control after acceleration when speed in a change target lane is greater than speed of the subject vehicle in the first and second cases. In particular, it may be assumed that speed (Vreg[k](0)) in a region and speed (Vp(0)) of a preceding vehicle of the subject vehicle are substantially constant irrespective of time. FIG. 6A shows the case in which the vehicle is operated to begin to be accelerated at maximum acceleration $a_{max}$ from initial speed Vego(0) of the vehicle to reach maximum speed Vmax at t3 through t1 and t2 and, then, to be decelerated at maximum deceleration to reach the speed Vreg[k](0) in the region at $t_{tg}$.

FIG. 6B shows the case in which the vehicle is operated to begin to be accelerated at maximum acceleration $a_{max}$ from initial speed Vego(0) of the vehicle to reach speed limit Vlim through t1 and t2, to be maintained at speed limit Vlim for predetermined time and, then, to be decelerated at maximum deceleration to reach the speed Vreg[k](0) of the region at $t_{tg}$. In other words, FIGS. 6A and 6B are different in terms of whether speed of the vehicle reaches speed limit Vlim. Hereinafter, this will be described in terms of FIG. 6A.

Area 'B' at t1 is a distance between the subject vehicle and a preceding vehicle and, in this regard, when area 'B' is the same as safety allowance, acceleration of the subject vehicle is not possible any longer and, since the subject vehicle is not capable of reaching the speed Vreg[k](0) of the region, the attributes of the corresponding region may be changed to a region in which lane change is not possible.

As shown in FIG. 6A, speed of the vehicle reaches the speed Vreg[k](0) of the region at t2 but a location of the vehicle is not capable of reaching a lateral side of a region in which lane change is possible and, thus, it is assumed that there is safety allowance and the vehicle is operated to reach arbitrary speed Vmax at t3 and then to be decelerated.

To correct the attributes of a region, the lane change region determiner 230 may be configured to detect whether the vehicle is capable of reaching the same speed as the speed in a corresponding region via acceleration in consideration of safety allowance (first correction condition) and detect whether a location of the vehicle is ahead of the sum of a lower x coordinate and a distance threshold for lane change in consideration of safety allowance and acceleration when the vehicle is capable of reaching the same speed as the speed in the region (second correction condition).

In other words, as shown in FIG. 6A, detection of whether the vehicle is capable of reaching the same speed as the speed in the region may be the same as detection a condition in which area 'B+C+D+E+F+G' as a distance between the subject vehicle and a preceding vehicle is equal to or less than the safety allowance. In addition, detection of whether a location (x coordinate=0) of the vehicle is ahead of the sum of a lower x coordinate after control (t=$t_{tg}$) and a distance threshold for lane change may be the same as detecting whether the distance threshold for lane change is less than a value obtained by subtracting an x coordinate (xMINreg[k](0)) of the region from (D+E)–A.

FIG. 7 shows expressions for correcting attributes of a region. First, expression 1 is obtained by calculating area 'B+C+D+E+F+G' as a distance between the subject vehicle and a preceding vehicle and, in this case, only maximum speed Vmax is not determined and the other values are constants provided to the lane change region determiner 230. In particular, to calculate the maximum speed Vmax, it may be assumed that the distance between the subject vehicle and the preceding vehicle is the same as the safety allowance. In particular, when the maximum speed Vmax calculated under the assumption that the distance between the subject vehicle and the preceding vehicle is the same as the safety allowance (the first correction condition is satisfied) satisfies the second correction condition, the attributes of the corresponding region need to be maintained in the lane changeable region and, the maximum speed Vmax does not satisfy the second correction condition, the attributes of the corresponding region need to be corrected to a region in which lane change is not possible.

Expression 2 shown in FIG. 7 is an equation for obtaining the maximum speed Vmax assuming that the distance between the subject vehicle and a preceding vehicle is the same as safety allowance. As shown, expression 2 represents a quadratic equation with respect to the maximum speed Vmax and, thus, the maximum speed Vmax may be calculated.

According to another exemplary embodiment of the present invention, expression 2 may be simplified using additional assumption to calculate the maximum speed Vmax. For example, assuming that current speed is immediately decelerated to region speed from the maximum speed Vmax without consideration of a section in which maximum deceleration $a_{min}$ is infinity, that is, a deceleration region, the maximum speed Vmax may be simply calculated.

Expression 3 is an equation for calculating A–(D+E) to detect whether a distance threshold for lane change is less than a value obtained by subtracting an initial lower x coordinate (xMINreg[k](0)) of a region from (D+E)–A or to detect whether a negative distance threshold for lane change is greater than the sum of A–(D+E) and the initial lower x coordinate (xMINreg[k](0)) of the region.

In addition, expression 4 is used to detect whether a negative distance threshold for lane change is greater than the sum of A–(D+E) and the initial lower x coordinate (xMINreg[k](0)) of the region. When the maximum speed Vmax calculated from expression 2 satisfies expression 4, the attributes of the region may be maintained in the lane changeable region without a change. Further, when the maximum speed Vmax calculated from expression 2 does not satisfy expression 4, the attributes of the region may be corrected to a region in which lane change is not possible.

FIG. 8 shows an example of when the attributes of a region Rx are corrected in the first case. In the drawing, in the case of acceleration or deceleration after acceleration, even when a vehicle is accelerated or decelerated after being decelerated until safety allowance is 0 at t=4T, a distance between the subject vehicle and a following vehicle in the region Rk is less than the distance threshold for lane change DIST_Threshold and, thus, the attributes of the region Rk may be corrected to the region in which lane change is not possible.

Referring back to FIG. 2, when there is a plurality of lane changeable regions even after the lane changeable region is corrected, the lane change region determiner 230 may be configured to select an optimal lane changeable region among the plurality of lane changeable regions (S40). When the command for lane change according to the second scenario is input, the optimal lane changeable region may be selected according to an algorithm shown in FIG. 9.

Referring to FIG. 9, the lane change region determiner 230 may be configured to execute the algorithm for selecting the optimal lane changeable region (S910) and recognize whether each of the plurality of lane changeable regions is positioned at a front side, a lateral side, or a rear side of the subject vehicle (S920). The lane change region determiner 230 may then be configured to compare the speed of the subject vehicle and the speed in a region, perform operation S940 when a difference between the speed of the subject vehicle and the speed in the region exceeds a threshold value (e.g., about 20 km/h) (Yes of S930), and perform operation S945 when the difference between the speed of the subject vehicle and the speed in the region does not exceed the threshold value (No of S930).

When there is a lane changeable region in a lateral side of the vehicle in operation S940 (Yes of S940), the lane changeable region positioned at the lateral side of the vehicle may be selected as the optimal lane changeable region (S970). When there is no lane changeable region at a lateral side of the vehicle in operation S940 (No of S940) and when there is a lane changeable region positioned at a front side of the vehicle (Yes of S950), a closest region thereamong may be selected as an optimal lane changeable region (S971).

In operation S950, when there is no lane changeable region positioned at the front side of the vehicle (No of S950) and when there is a lane changeable region positioned at a rear side of the vehicle (Yes of S960), a closest region thereamong may be selected as an optimal lane changeable region (S972). When there is no lane changeable region positioned at the rear side of the vehicle (No of S960), it may be determined that there is no optimal lane changeable region (S973).

In operation S945, when there is a lane changeable region positioned at a lateral side of the vehicle (Yes of S945), the lane changeable region positioned at a lateral side of the vehicle may be selected as the optimal lane changeable region (S974). In operation S945, when there is no lane changeable region positioned at a lateral side of the vehicle (No of S945) and when there is a lane changeable region positioned at a rear side of the vehicle (Yes of S955), a closest region thereamong may be selected as an optimal lane changeable region (S975).

In operation S955, when there is no lane changeable region positioned at a rear side of the vehicle (No of S955) and when there is a lane changeable region positioned at a front side of the vehicle (Yes of S965), a closest region thereamong may be selected as an optimal lane changeable region (S976). When there is no lane changeable region positioned at a front side of the vehicle (No of S965), it may be determined that there is no optimal lane changeable region (S977).

As shown in FIG. 9, when lane change is performed in response to the command for lane change according to the second scenario, the lane change region determiner 230 may be configured to compare relative positions of the vehicle and a region and speed of the vehicle and the speed in the region and select a region that is currently close to the vehicle or a region that becomes gradually close to the vehicle according to time as the optimal lane changeable region. When lane change is performed in response to the command for lane change according to the third scenario, the lane change region determiner 230 may be configured to select a region for minimizing an absolute moving distance of the vehicle up to a position and speed of the corresponding region as the optimal lane changeable region.

The lane change region determiner 230 may be configured to determine a method of adjusting speed in a longitudinal direction, defined according to the time-speed graph with respect to any one region shown in FIG. 6, for each of the plurality of lane changeable regions. In particular, the method of adjusting speed in a longitudinal direction for each region may be determined using parameters such as initial speed of the vehicle, initial speed in a region, maximum acceleration (e.g., maximum acceleration in consideration of acceleration limit of the vehicle and traffic flow), maximum deceleration (e.g., a highest value of deceleration in a range in which there is no crash risk with a following vehicle), maximum speed limit (e.g., maximum speed in a driving road according to law), minimum speed limit (e.g., minimum speed for preventing obstruction of traffic flow in a current road, e.g., about 70% of maximum speed limit or about 80% of current speed of the vehicle is determined), minimum speed (e.g., Vmin as a minimum speed value of the vehicle during control of deceleration or acceleration after deceleration, when calculated minimum speed is less than minimum speed limit, minimum speed may be corrected to the minimum speed limit), and maximum speed (e.g., Vmax as a maximum speed value of the vehicle during control of deceleration after acceleration, when calculated minimum speed is greater than maximum speed limit, maximum speed may be corrected to the same as maximum speed limit). In addition, it may be assumed that the speed in a region is not changed according to time.

FIGS. 10A-10B illustrate an example of a method of controlling speed in a longitudinal direction for each position of a lane changeable region when speed of the vehicle is greater than the speed in the region. As shown in FIGS. 10A-10B, via control of deceleration after acceleration, acceleration after deceleration, etc., the method of adjusting speed in a longitudinal direction for each region may be calculated such that speed of the vehicle becomes equal to the speed in the region and the vehicle is positioned at a lateral side of the region.

As shown in FIG. 10A, when there are two lane changeable regions at a rear and lateral side of the subject vehicle, each region may correspond to a region in which a vehicle is capable of being operating with a minimum speed greater than minimum speed limit and a region in which the vehicle is capable of being operated with a minimum speed less than minimum speed limit.

As shown in FIG. 10B, when there are five lane changeable regions at a front and lateral side of the subject vehicle, each region may correspond to a region in which safety allowance is greater than 0 (e.g., control is possible such that the vehicle approaches a preceding vehicle) and a vehicle is capable of being operated with no maximum speed limit or maximum speed does not reach the maximum speed limit, a region in which safety allowance is greater than 0, there is maximum speed limit, and maximum speed is greater than maximum speed limit, a region in which a vehicle is capable of being operated to be decelerated after being maintained due to safety allowance of 0, a region in which a vehicle is capable of being operated such that minimum speed is greater than minimum speed limit, and a region in which minimum speed is less than minimum speed limit.

The lane change region determiner 230 may be configured to calculate an absolute moving distance of the vehicle until the speed of the vehicle reaches the speed in a region with respect to a method of adjusting the speed in a longitudinal direction for each of seven regions shown in FIGS. 10A-10B and select a region that corresponds to when a vehicle is moved by a minimal degree as an optimal lane changeable region. In particular, for the command for lane change according to the third scenario, lane change needs to be completed while a vehicle is moved by a minimal degree.

When the speed of the vehicle is less than the speed in a region (the first or second case), a method of adjusting speed in a longitudinal direction of the vehicle for reaching a region to correct the attributes of the region (e.g., the time-speed graph of FIG. 6) may be predetermined and, as shown in the example of FIGS. 10A-10B, the lane change region determiner 230 may be configured to calculate an absolute moving distance of the vehicle until the speed of the vehicle reaches the speed in the region with respect to the method of adjusting speed in a longitudinal direction for each region and select a region that corresponds to when a vehicle is moved by a minimal degree as the optimal lane changeable region. When lane change needs to be performed in response to the command for lane change according to the fourth scenario, the lane change region determiner 230 may be configured to preferentially select a lateral or rear region that a vehicle is capable of entering by maintaining speed or deceleration without control of acceleration, as the optimal lane changeable region.

Referring back to FIG. 2, the lane change region determiner 230 may be configured to transmit information regarding a location of the selected optimal lane changeable region and a lane change region for reaching the speed in the region (i.e., information regarding a method of adjusting speed in a longitudinal direction) to the main control logic 220 and the main control logic 220 may operate the driver 300 to adjust the speed of the vehicle according to the information regarding the lane change region (S50).

When speed control in a longitudinal direction is completed (or when the command for lane change according to the first scenario is generated), the main control logic 220 may be configured to calculate a risk degree of collision upon lane change (S60) and return to the case (i.e., lane maintained) prior to the generation of the command for lane change (S10) when the calculated risk degree of collision exceeds a threshold value or may be configured to calculate a risk degree of collision at a predetermined period and compare the risk degree with a threshold value. When the calculated risk degree is equal to or less than the threshold value, the driver 300 may be operated to change lanes (S70). In particular, the risk degree may be calculated in consideration of a distance to a preceding/following vehicle of a change target lane, TTC, etc. but the present invention is not limited thereto.

According to an exemplary embodiment of the present invention, an ECU, an autonomous vehicle including the ECU, and a control method of lane change thereof may select a most appropriate lane change region according to a situation in which lane change is required to change lanes to increase probability of success of lane change in a situation in which lane change is required and to simultaneously enable rapid lane change, thereby enhancing complete control of autonomous driving.

According to an exemplary embodiment of the present invention, an ECU, an autonomous vehicle including the ECU, and a control method of lane change thereof may select a most appropriate lane change region based on a situation in which lane change is required to change lanes to increase probability of success of lane change in a situation in which lane change is required and to simultaneously enable rapid lane change, thereby enhancing complete control of autonomous driving.

It will be appreciated by persons skilled in the art that that the effects that could be achieved with the present invention are not limited to what has been particularly described hereinabove and other advantages of the present invention will be more clearly understood from the above detailed description taken in conjunction with the accompanying drawings.

The aforementioned method of operating the AVN 200 may be embodied as computer readable codes on a computer readable recording medium. The computer readable recording medium is any data storage device that may store data which may be read by a computer system. Examples of the computer readable recording medium include read-only memory (ROM), random-access memory (RAM), magnetic tape, magnetic disk, flash memory, optical data storage devices, etc. The computer readable recording medium may also be distributed over network coupled computer systems so that the computer readable code is stored and executed in a distributed fashion.

Accordingly, the above detailed description is not intended to be construed to limit the present invention in all aspects and be considered by way of example. The scope of the present invention should be determined by reasonable interpretation of the accompanying claims and all equivalent modifications made without departing from the present invention should be included in the following claims.

What is claimed is:

1. A method of controlling lane change of an autonomous vehicle, comprising:
   determining, by a controller, a type of a command for lane change using an autonomous driving logic in response to the command for lane change being generated;
   determining, by the controller, an attribute on each region of a plurality of regions included in a change target region according to the type of the command for lane change determined, the attribute of each region including one of a region in which lane change is possible, a region in which lane change is difficult even when lane change is possible, and a region in which lane change is not possible;
   correcting, by the controller, the attribute of each region using information regarding a lane in which the autonomous vehicle is being driven; and
   determining, by the controller, a lane change region from the plurality of regions included in the change target region based on the corrected attribute of each region.

2. The method according to claim 1, wherein the type of the command for lane change is classified into commands for lane change according to first to fourth scenarios; and wherein the determining of the attribute of each region is performed for commands for lane change according to second to fourth scenarios.

3. The method according to claim 2, wherein the first scenario is a situation in which lane change is not needed immediately or within a short period of time;
   wherein the second scenario is a situation in which speed control is required due to a driver requested lane change when a distance between vehicles driven in change target lanes is variable;
   wherein the third scenario is a situation in which lane change is required but relative temporal and spatial allowance is present; and
   wherein the fourth scenario is a situation in which lane change is required and temporal and spatial allowance is not present.

4. The method according to claim 1, wherein the determining of the attribute of each region includes:
   combining, by the controller, a first condition of a distance between a preceding vehicle and a following vehicle, for defining each region, and a second condition of time to collision (TTC) of the preceding vehicle and the following vehicle to determine the attribute of each region.

5. The method according to claim 4, wherein when the distance between the preceding vehicle and the following vehicle is less than a specific threshold distance or the TTC of the preceding vehicle and the following vehicle is less than a specific threshold time, the attribute of each region is determined as a region in which lane change is not possible.

6. The method according to claim 5, wherein when the distance between the preceding vehicle and the following vehicle is equal to or greater than the specific threshold distance or the TTC of the preceding vehicle and the following vehicle is equal to or greater than the specific threshold time, the attribute of each region is determined as a lane changeable region.

7. The method according to claim 1, wherein the correcting of the attribute of each region using information regarding a lane in which the autonomous vehicle is being driven includes:

when speed in a region is greater than speed of the autonomous vehicle and the region is positioned at a front and lateral side or a lateral side of the autonomous vehicle, when a lower x coordinate of the region is greater than a value obtained by subtracting a desired distance from an x coordinate of the preceding vehicle of the autonomous vehicle, changing the attribute of each region in which lane change is not possible;

when the autonomous vehicle is not capable of reaching a same speed as the speed in the region via acceleration in consideration of safety allowance, changing, by the controller, the attribute of each region in which lane change is not possible; and when the autonomous vehicle is capable of reaching the same speed as the speed in the region, detecting, by the controller, whether a location of the autonomous vehicle is ahead of a sum of a lower x coordinate of the region and a distance threshold for lane change in consideration of the safety allowance.

8. The method according to claim 1, wherein the correcting of the attribute of each region using information on a lane in which the autonomous vehicle is driven includes:

when speed in a region is greater than speed of the autonomous vehicle and the region is positioned at a rear and lateral side of the autonomous vehicle, when the autonomous vehicle is not capable of reaching a same speed as the speed in the region via acceleration in consideration of safety allowance, changing, by the controller, the attribute of each region in which lane change is not possible; and when the autonomous vehicle is capable of reaching the same speed as the speed in the region, detecting, by the controller, whether a location of the autonomous vehicle is ahead of a sum of a lower x coordinate of the region and a distance threshold for lane change in consideration of the safety allowance.

9. The method according to claim 8, wherein the detecting of whether the location of the autonomous vehicle is ahead of a sum of the lower x coordinate of the region and the distance threshold for lane change includes:

comparing, by the controller, the distance threshold for lane change and the lower x coordinate of the region assuming that a distance between the autonomous vehicle and the region is the same as the safety allowance after the autonomous vehicle reaches the same speed as the speed in the region.

10. The method according to claim 1, wherein the correcting of the attribute of each region using information regarding a lane in which the autonomous vehicle is being driven includes:

when the speed in the region is equal to or less than the speed of the autonomous vehicle and the region is positioned at a front and lateral side or lateral side of the autonomous vehicle, when the speed in the region is the same as the speed of the autonomous vehicle via deceleration in consideration of maximum deceleration when deceleration of the autonomous vehicle is allowed, detecting, by the controller, whether a location of the autonomous vehicle is ahead of a sum of the lower x coordinate of the region and the distance threshold for lane change; and when the location of the autonomous vehicle is behind the sum of the lower x coordinate of the region and the distance threshold for lane change, changing, by the controller, the attribute of each region in which lane change is not possible.

11. The method according to claim 1, wherein when the command for lane change is based on the second scenario, the determining of the lane change region from the at least one region includes:

determining, by the controller, the lane change region from the at least one region based on a difference between the speed of the autonomous vehicle and the speed in the region and a relation between a location of the autonomous vehicle and a location of the region.

12. The method according to claim 1, wherein when the command for lane change is based on the third scenario, the determining of the lane change region from the at least one region includes:

calculating, by the controller, an absolute moving distance of the autonomous vehicle until the speed of the autonomous vehicle reaches the speed in the region; and selecting, by the controller, a region in which the absolute moving distance is minimum as a lane changeable region.

13. An electronic control unit (ECU) of an autonomous vehicle, comprising:

a main control logic programmed to generate a command for lane change classified into commands for lane change according to first to fourth scenarios; and a lane change region determiner configured to determine an attribute of each region of a plurality of regions included in a change target region using information regarding the change target region according to the command for lane change, the attribute of each region including one of a region in which lane change is possible, a region in which a lane change is difficult even when lane change is possible, and a region in which lane change is not possible, to correct the attribute of each region using information regarding a lane in which the autonomous vehicle is driven, and to determine a lane change region from the plurality of regions included in the change target region based on the corrected attribute of each region.

14. The ECU according to claim 13, wherein the lane change region determiner is configured to combine a first condition of a distance between a preceding vehicle and a following vehicle, for defining each region, and a second condition of time to collision (TTC) of the preceding vehicle and the following vehicle to determine the attribute of each region.

15. The ECU according to claim 13, wherein when speed in a region is greater than speed of the autonomous vehicle, when the autonomous vehicle is capable of reaching the same speed as the speed in the region, the lane change region determiner is configured to detect whether a location of the autonomous vehicle is ahead of a sum of a lower x coordinate of the region and a distance threshold for lane change in consideration of the safety allowance.

16. The ECU according to claim 15, wherein the lane change region determiner is configured to compare the distance threshold for lane change and the lower x coordinate of the region assuming that a distance between the autonomous vehicle and the region is the same as the safety allowance after the autonomous vehicle reaches the same speed as the speed in the region.

17. The ECU according to claim 13, wherein when the command for lane change is based on the second scenario, the lane change region determiner is configured to determine the lane change region from the at least one region based on a difference between the speed of the autonomous vehicle and the speed in the region and a relation between a location of the autonomous vehicle and a location of the region.

18. The ECU according to claim 13, wherein when the command for lane change is based on the third scenario, the lane change region determiner is configured to calculate an absolute moving distance of the autonomous vehicle until the speed of the autonomous vehicle reaches the speed in the region and select a region in which the absolute moving distance is minimum as a lane changeable region.

19. An autonomous vehicle, comprising:
an electronic control unit (ECU) configured to determine an attribute of each region of a plurality of regions included in a change target region using information regarding the change target region according to the command for lane change, the attribute of each region including one of a region in which lane change is possible, a region in which a lane change is difficult even when lane change is possible, and a region in which lane change is not possible, to correct the attribute of each region using information regarding a lane in which the autonomous vehicle is driven, and to determine a lane change region from the plurality of regions included in the change target region based on the corrected attribute of each region,
wherein driving of the autonomous vehicle is controlled based on a control signal generated by the ECU.

* * * * *